United States Patent [19]

Dunham et al.

[11] 4,422,624
[45] Dec. 27, 1983

[54] CONCENTRATE BURNER

[75] Inventors: H. E. Dunham; David Arana, both of Morenci, Ariz.; Terrell D. Jackson, Littleton, Colo.; Brent E. McEuen, Safford; John A. Schneider, Morenci, both of Ariz.

[73] Assignee: Phelps Dodge Corporation, New York, N.Y.

[21] Appl. No.: 296,874

[22] Filed: Aug. 27, 1981

[51] Int. Cl.³ .................. F27D 3/10; F23D 11/36
[52] U.S. Cl. ...................... 266/182; 266/221; 266/267; 431/160; 75/92
[58] Field of Search .............. 266/267, 182, 221; 431/160; 75/92

[56] References Cited

U.S. PATENT DOCUMENTS

| | | | |
|---|---|---|---|
| 2,342,368 | 2/1944 | Queneau | 75/26 |
| 2,951,756 | 9/1960 | Cavanagh | 75/40 |
| 3,365,185 | 1/1968 | Elvander et al. | 75/92 |
| 4,165,979 | 8/1979 | Davies et al. | 75/92 |
| 4,217,132 | 8/1980 | Burge et al. | 75/26 |

Primary Examiner—M. J. Andrews
Attorney, Agent, or Firm—Donald E. Degling

[57] ABSTRACT

A burner for smelting metal-bearing sulfide ores or concentrates by means of an oxygen-rich gas is disclosed. The oxygen-rich gas is introduced into a chamber so as to aspirate or eject the metal-bearing sulfide ore or concentrate. The oxygen-rich gas and sulfide concentrate are intimately admixed in a cylindrical mixing chamber and then jetted into the heated atmosphere of a smelting furnace.

10 Claims, 5 Drawing Figures

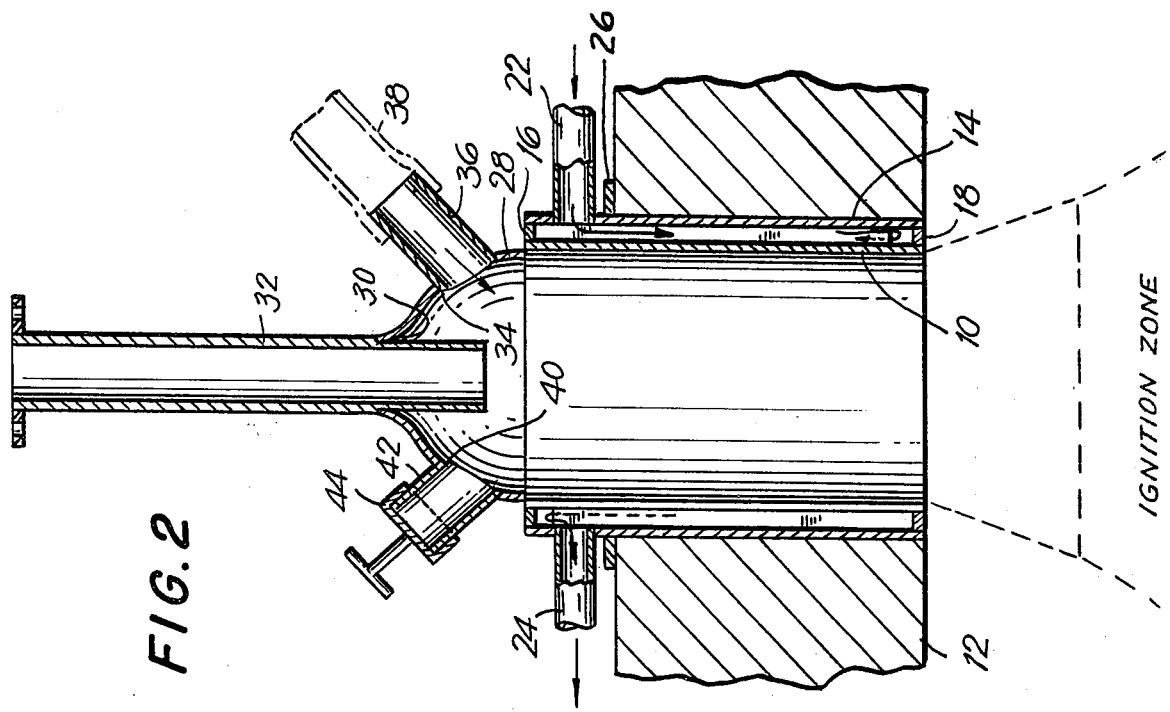
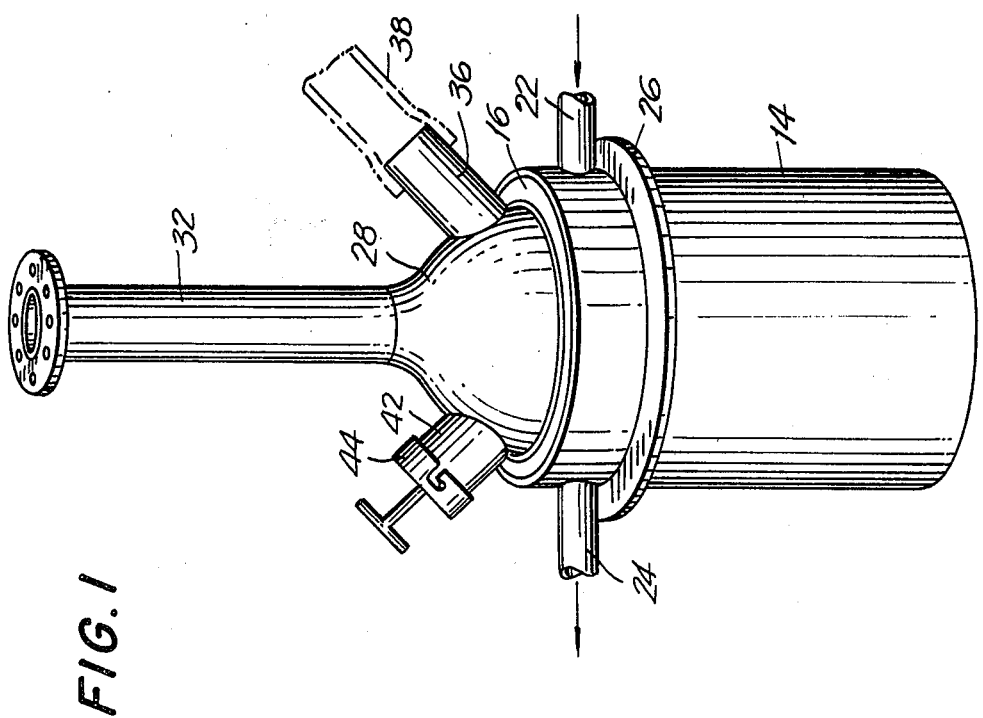

CONCENTRATE BURNER

BACKGROUND OF THE INVENTION

1. Field of the Invention

The present invention relates to an apparatus for use in the smelting of metal-bearing sulfide concentrates or ores. More particularly, it relates to a burner construction wherein an oxygen rich gas and a sulfide concentrate or pulverized ore are mixed and then jetted into a hot atmosphere within a furnace.

2. Prior Art

Pyrometallurgical processes for the smelting of non-ferrous metal-bearing ores or concentrates have been known for many years. One of the most common is the so-called reverberatory furnace process in which heat is generated inside the furnace by means of fuel burners mounted in the end wall of the furnace. In addition to the reverberatory furnace process, various flash smelting processes have been suggested. These processes generally involve the introduction of ore or concentrate in pulverized or granular form along with an oxidizer and, in some cases, fuel. A water-cooled burner designed to introduce ore, fuel and air horizontally over the hearth of a reverberatory furnace is disclosed in Ruthenberg U.S. Pat. No. 720,490. Other fuel/concentrate burners are disclosed in Banes U.S. Pat. No. 1,073,463; Klepinger U.S. Pat. No. 1,164,653; DeBethune U.S. Pat. No. 1,693,916; Freeman U.S. Pat. No. 1,888,164; and Cavanagh U.S. Pat. No. 2,951,756. Worner U.S. Pat. No. 3,326,671 discloses, particularly in FIG. 31, a concentrate burner for use in a direct smelting process, while Elvander et al., in U.S. Pat. No. 3,365,185, disclose a vortex-type burner for a flash smelting process. A concentric concentrate burner for use in a continuous copper converter process is disclosed in Holeczy U.S. Pat. No. 3,459,415. Yannapoulos U.S. Pat. No. 3,674,463 discloses a burner designed to handle recycled matte, concentrate and an oxidizing gas in a flash smelting process for the production of copper. A concentrate burner for the Outokumpu flash smelting process is disclosed in Lilja et al. U.S. Pat. No. 4,147,535, while a cupriferrous slurry burner for a direct copper process is shown in Arentzen U.S. Pat. No. 4,148,630. Davies U.S. Pat. No. 4,165,979 discloses a water-cooled tunnel burner for use in the well-known Inco flash smelting process.

In the sprinkle smelting process for smelting sulfide ores or concentrate described in the recent Queneau et al. U.S. Pat. No. 4,236,915, roof-mounted burners are provided which form a plurality of paraboloidal suspensions of concentrate, flux and oxygen-rich gas within the hot atmosphere of the furnace.

SUMMARY OF THE INVENTION

In accordance with the present invention, a novel concentrate burner is provided for the autogenous smelting of metal-bearing sulfide ore or concentrate. Oxygen-enriched air or commercially pure oxygen is used to eject the sulfide concentrate or ore and to form an intimate admixture therewith which may be jetted to the surface of the molten metal matte and slag in a refractory-lined furnace where a heated atmosphere is present. Upon contact with the heated atmosphere, the sulfur in the oxygen/sulfide concentration mixture oxidizes to form sulfur dioxide and heat is generated. The heat is sufficient to melt the concentrate which then becomes part of the molten bath and separates into its matte and slag components. Excess heat from the reaction may be used to melt additional ore or concentrate introduced into the furnace other than through the concentrate burner.

The burner of the present invention comprises a cylindrical water-cooled mixing chamber, usually mounted in the roof of the smelting furnace with its axis generally vertically disposed. A generally bell-shaped housing is mounted on one end of the mixing chamber. Enriched air or pure oxygen is introduced into the bell-shaped housing by an oxygen feed pipe preferably aligned with the axis of the mixing chamber. A concentrate feed pipe communicates with the bell-shaped housing. A clean-out and observation port is also provided in the bell-shaped housing.

DESCRIPTION OF THE DRAWINGS

Additional advantages of the novel combination according to the present invention will become apparent from the following detailed description of the invention and the accompanying drawings in which:

FIG. 1 is an isometric view of the burner in accordance with the present invention;

FIG. 2 is a vertical cross-section taken through the axis of the burner and showing the burner installed in the roof of a smelting furnace.

DETAILED DESCRIPTION OF THE INVENTION

Figure 3:
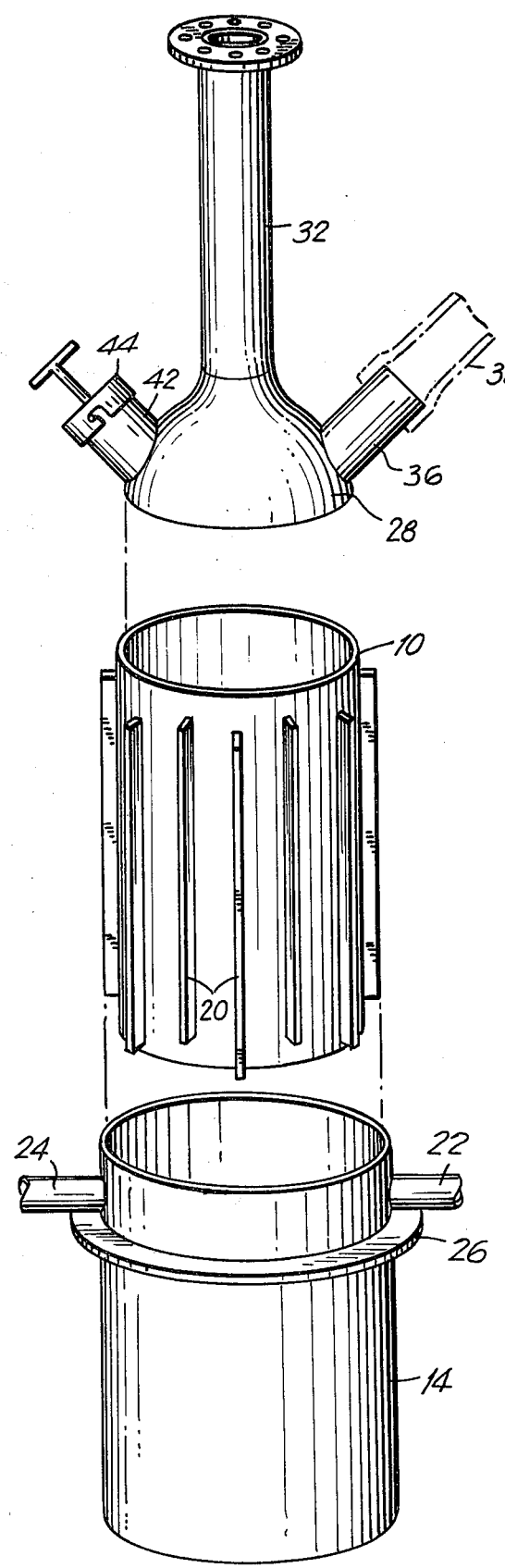
FIG. 3 is an exploded view of the burner of FIGS. 1 and 2 showing, more clearly, the principal components thereof.

Referring now to the drawings, the burner comprises a mixing chamber 10 which is cylindrical in form and of sufficient length to extend through the refractory roof 12 of the smelting furnace. The mixing chamber 10 is surrounded by a water jacket 14 which is interconnected with the mixing chamber. Preferably, the rings 16, 18 are affixed to the mixing chamber 10 and water jacket 14 by welding. A series of ribs 20 are welded longitudinally about the exterior of the mixing chamber. As shown in FIG. 3, the ribs 20 are slightly shorter than the axial distance between the rings 16, 18 and are alternately offset so as to define a serpentine channel within the water jacket 14. A cooling water intake pipe 22 communicates through the water jacket 14 near the top thereof and, approximately diametrically opposite thereto, a cooling water outlet pipe 24 communicates through the water jacket 14. If desired, the cooling water inlet and outlet pipes 22, 24 may be located adjacent to each other with the serpentine channel disposed therebetween. An annular support 26 is affixed to the outer surface of the water jacket 14 below the inlet pipe 22 and outlet pipe 24 to locate the mixing chamber 10 in the roof 12 of the furnace. The annular support 26 is positioned so that the open end of the mixing chamber 10 is flush with the inner surface of the roof 12 of the furnace.

A convexo-concave housing 28, which may be hemispherical or bell-shaped, is welded to the upper end of the mixing chamber 10 so that its concave surface is adjacent the interior surface of the mixing chamber. The housing 28 is provided with a first orifice 30 concentric with the axis of the mixing chamber 10 and housing 28 which has affixed therein an oxidizing gas feed pipe 32. A second orifice 34 in the housing 28 is adapted to receive a concentrate feed port 36 which communicates through a concentrate feed duct 38 to a source of dry, pulverized sulfide concentrate (not shown). It will be appreciated that a plurality of feed ports 36 may be located around the circumference of housing 28. A third orifice 40 in the housing 28 locates a nipple 42 which is covered by a removable cap 44. The axes of the port 36 and nipple 42 are preferably located so as to intersect the axis of the feed pipe 32. The nipple 42 functions as a clean-out and inspection port and provides easy access to the inside of the burner without removing the burner from the roof 12 of the furnace.

Referring particularly to FIG. 2, it will be noted that the gas feed tube extends into the central region of the housing 28 and terminates at a point approximately in the plane normal to the axis of the feed pipe 32 and passing through the bottom edge of the orifice 34. Gas exiting from the feed pipe 32 into the housing 28 and mixing chamber 10 will induce a sub-atmospheric or negative pressure within the housing 28 above the exit end of the feed pipe 32. The sub-atmospheric pressure aspirates the gravity-fed dry concentrate into the housing 28 where it becomes entrained and intimately mixed with the oxidizing gas jetted from the feed pipe 32. Thus, the feed pipe 32 and housing 28 function as an ejector pump to draw concentrate into the burner. Due to the use of the ejector principle, it will be appreciated that the housing 28 must be tightly sealed to the mixing chamber 10 and that, in turn, the feed pipe 32, port 36, and nipple 42 must be sealed to the housing 28. Of course, during operation, the cap 44 should be in place to seal the nipple 42.

Figure 2A:
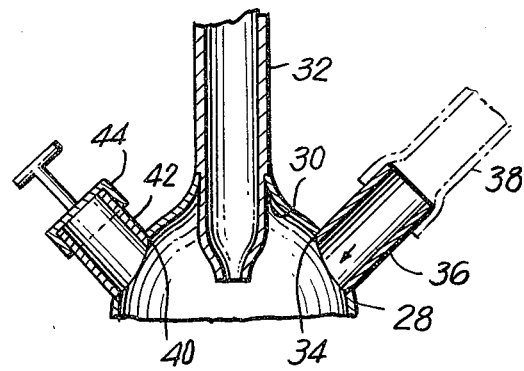
FIG. 2A is a fragmentary vertical cross section of the burner of FIG. 2 employing a converging nozzle for the oxidizing feed pipe 32.
Figure 2B:
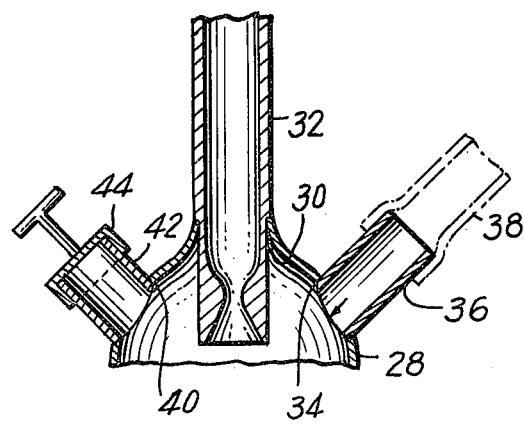
FIG. 2B is a fragmentary vertical cross section of the burner of FIG. 2 employing a converging-diverging nozzle for the oxidizing feed pipe 32.

As shown in FIG. 2, the gas feed pipe 32 has a uniform shape within the housing 28 so that its end functions as a cylindrical or straight nozzle. If it is desired to increase the velocity of the jet issuing from the end of the gas feed pipe 32, the cross-sectional area of the end of the pipe may be reduced gradually so as to form a converging nozzle as illustrated in FIG. 2A. As the velocity at the exit end of the gas feed pipe 32 increases, the static pressure will decrease thereby increasing the ejector effect of the apparatus. The maximum velocity attainable with the converging nozzle is sonic velocity at the local conditions. If greater velocities should be desired, recourse may be had to a converging-diverging nozzle as illustrated in FIG. 2B which is capable of producing supersonic velocities in the diverging portion of the nozzle and the regions just beyond the exit end of the nozzle. However, where, as here, enriched air or pure oxygen are involved, it may be necessary to cool the nozzle and the portions of the feed pipe where relatively high gas velocities occur.

As noted above, the sulfide concentrate is dry and pulverized. Applicants have found that the moisture content of the concentrate should be less than 0.5 percent and preferably in the range of 0.2 to 0.3 percent. With respect to size, applicants have found that at least 85 percent of the concentrate should be less than 325 mesh. Under these conditions, the concentrate will flow through the burner easily and, upon contacting the heating atmosphere within the furnace, will achieve smelting temperatures quickly.

As shown in FIG. 2, the mixture of oxygen or oxygen-enriched air and concentrate exits from the burner as an expanding jet within the heated atmosphere of the furnace. A few inches below the open end of the mixing chamber, in the region designated "Ignition Zone" in FIG. 2, the temperature within the jet reaches the flash point and combustion of the sulfur and iron begins. The combustion reaction is exothermic and, therefore, after producing an offgas rich in $SO_2$, a liquid slag rich in iron and silica, and a matte rich in copper, excess heat is available to smelt concentrate or ore which may have been introduced into the furnace other than through the burner.

The burner of the present invention provides a relatively narrow flame having a vertical profile that impinges directly on the surface of the bath. Thus, the heat is concentrated at, and within, the bath and away from the furnace and sidewalls. As excess heat is available and as it is also desirable to protect the sidewalls of the furnace which may not otherwise be protected by water jackets or the like, it is advantageous to introduce additional ore or concentrates along the furnace sidewalls where secondary smelting can occur. Becuse of the relatively high flow of oxygen and concentrate through the burner and the violence of the reaction, the flame is relatively undisturbed by the horizontal flow of gas through the furnace due to the natural or induced draft on the furnace.

The high rate of reaction within the burner causes the products of combustion, including the unsmelted particulates, ash and dust to be impacted against, and partially captured by, the molten bath of matte and slag. Thus, the particulate carry-over in the offgas is less than 5 percent of the total solids charged into the furnace. The impingement and mixing of the liquid matte and slag within the bath in the region under the burner facilitates the agglomeration of matte particles and therefore enhances the separation of matte and slag in the regions of the furnace remote from the burner.

The burner in accordance with the present invention is constructed from standardized components and is thus both rugged and easily serviced. Applicants have fabricated a burner in accordance with the present invention where the mixing chamber 10 was formed from a 10-inch diameter steel pipe, while the oxygen feed pipe 32 comprised a 4-inch diameter steel pipe. Additional sections of 4-inch diameter steel pipe were used for the concentrate feed port 36 and nipple 42. The housing 28 was adapted from a pipe reducer coupling of appropriate size. Although the mixing chamber, preferably, is water-cooled, it may be desirable to mount a water-cooled copper block in the furnace roof to receive the jacketed burner assembly.

Because there are no moving parts in the burner and no abrupt changes of direction in the flow of the gas and the concentrate, the burner will function over a wide range of gas to concentrate ratios. Moreover, the burner is relatively insensitive to variations in the composition of the concentrate, provided that the concentrate is sufficiently dry and of such grain size that it will flow through the burner and rapidly attain its smelting temperature within the furnace atmosphere.

A single burner having a 10-inch diameter mixing chamber and a 4-inch diameter concentrate feed pipe as mentioned above was successfully operated by applicants at feed rates varying between 18 and 30 tons per hour. Moreover, when two burners in accordance with the present invention, together with auxiliary fuel burners, were installed in a reverberatory furnace having a normal smelting rate of 700–800 tons per day, the smelting rate was increased to the rate of 1600–1800 tons per day, while the arch temperature in the furnace was decreased from a range of 2200°–2600° F. to a range of 1900°–2000° F.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A sulfide concentrate burner particularly adapted for use in the flash smelting of sulfide concentrates in a reverberatory furnace comprising a cylindrical mixing chamber, a convexo-concave housing affixed to one end of said mixing chamber, an oxidizing gas feed pipe extending through said convexo-concave housing and into the central part of the concave portion thereof and aligned with the central axis of said mixing chamber, and at least one concentrate feed port located in said convexo-concave housing, said oxidizing gas feed pipe adapted to eject a jet of oxidizing gas into said mixing chamber and create a subatmospheric pressure within said convexo-concave housing whereby sulfide concentrate is aspirated from said concentrate feed port and mixed with said jet of oxidizing gas to produce at the end of said mixing chamber opposite said convexo-concave housing a jet comprising a mixture of oxidizing gas and sulfide concentrate.

2. A concentrate burner as set forth in claim 1, wherein the housing is bell-shaped.

3. A concentrate burner as set forth in claim 1, wherein the housing is hemispherical.

4. A concentrate burner as set forth in claim 1, wherein the axis of the concentrate feed port intersects the axis of the oxidizing gas feed pipe.

5. A concentrate burner as set forth in claim 1, having, in addition, a water jacket surrounding the cylindrical wall of the mixing chamber.

6. A concentrate burner as set forth in claim 5, having, in addition, a closable clean-out port formed in the convexo-concave mixing chamber.

7. A concentrate burner as set forth in claim 6, wherein the axis of the clean-out port intersects the axis of the oxidizing gas feed pipe.

8. A concentrate burner as set forth in claim 6, wherein the oxidizing gas feed pipe extends into the central part of the concave portion of the convexo-concave housing a distance defined substantially by a plane normal to the axis of the oxidizing gas feed pipe and passing through the edge of the concentrate feed port which is closest to the mixing chamber.

9. A concentrate burner as set forth in claim 1, having, in addition, a converging nozzle mounted on the end of the oxidizing gas feed pipe located within the concave portion of the convexo-concave housing.

10. A concentrate burner as set forth in claim 1, having, in addition, a converging-diverging nozzle mounted on the end of the oxidizing gas feed pipe located within the concave portion of the convexo-concave housing.

* * * * *